(No Model.)

F. A. MAGOWAN.
MODE OF UTILIZING DISCARDED RUBBER BELTING.

No. 292,020. Patented Jan. 15, 1884.

WITNESSES:
James F. John
John M. Clayton

INVENTOR:
Frank A. Magowan
by his Attorneys
Howson & Sons

UNITED STATES PATENT OFFICE.

FRANK A. MAGOWAN, OF TRENTON, NEW JERSEY.

MODE OF UTILIZING DISCARDED RUBBER BELTING.

SPECIFICATION forming part of Letters Patent No. 292,020, dated January 15, 1884.

Application filed November 22, 1883. (No model.)

*To all whom it may concern:*

Be it known that I, FRANK A. MAGOWAN, a citizen of the United States, residing in Trenton, Mercer county, New Jersey, have invented a Mode of Utilizing Discarded Rubber Belting, of which the following is a specification.

My invention consists of the mode described hereinafter of utilizing rubber belting which has become so far worn that it is no longer available for driving machinery.

Figure 1:
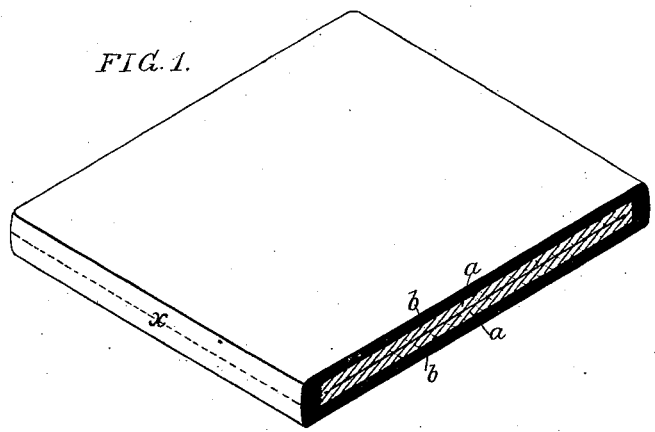
Figure 2:
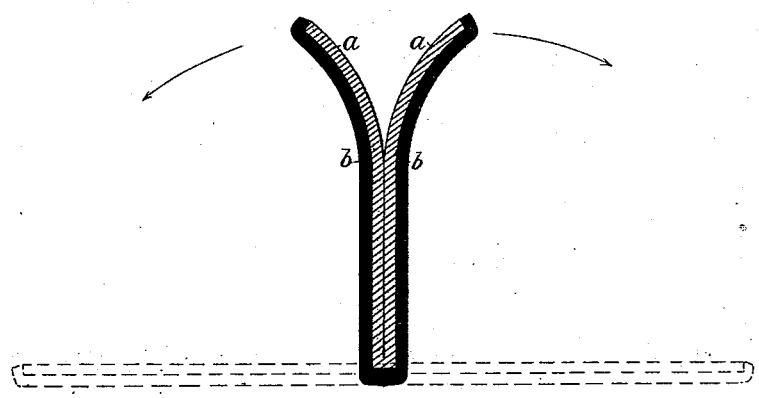
Figure 3:
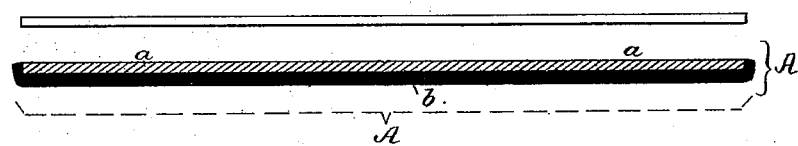

The rubber belt, a portion of which is illustrated by the sectional perspective view, Figure 1 of the accompanying drawings, consists of two layers, a a, of fabric, generally cotton duck, cemented together and clothed with rubber b b, cemented to the fabric. In utilizing a worn-out belt of this kind I cut it transversely into strips of such length as the mats or slabs into which it has to be converted may suggest. Each strip is then cut on one edge, x, so as to expose the fabric, and is then ripped by pulling it apart at the cut edge, as shown in Fig. 2, the separation being where the two layers of fabric were cemented together, and the ripping being continued until the edge opposite to that which was cut is reached, when there will be a flat strip, A, Fig. 3, consisting of a single layer, a, of fabric and a layer, b, of rubber cemented thereto. If desired, a long worn-out belt may be ripped in the manner described, and then cut into sections of the desired length. Each section or strip is subjected to pressure between plates, one of which may be made to corrugate or emboss the rubber surface of the strip, which is at the same time revulcanized, and the result will be a very cheap mat; but the rubber of worn-out belting is generally such that an additional layer of rubber must be added to the strip A, and this may be cemented to the fabric side of the said strip or to the rubber side of the same prior to subjecting it to pressure and revulcanization, a corrugated, ribbed, or other patterned surface being imparted, if desired, to this additional layer of rubber in the usual way. When a rubber belt of larger size and thickness, and having four layers of fabric has to be utilized, the ripping of the strips should be such that when the strip is folded out it will consist of two united strips of fabric combined with a layer of rubber, and when the belt has three, or any other uneven number of layers of fabric, the middle layer should be entirely removed, so that the ripped and folded-out strip may be of uniform thickness throughout.

By the above-described process worn belts of small size may be converted into small mats suitable for carriage-steps, larger belts being converted into larger mats; or the utilized belting may be applied to many other different uses.

I claim as my invention—

1. The mode herein described of utilizing worn rubber belting, the said mode consisting in first ripping strips of the belting; second, folding out the ripped strips; and, third, subjecting the same to pressure and to the process of vulcanizing, all substantially as set forth.

2. The mode herein described of first ripping strips of rubber belting; second, folding out the strips; third, applying to the same a layer or layers of rubber; and, fourth, subjecting the whole to pressure and to the process of vulcanizing, substantially as specified.

In testimony whereof I have signed my name to this specification in the presence of two subscribing witnesses.

F. A. MAGOWAN.

Witnesses:
  JOHN M. CLAYTON,
  HARRY SMITH.